United States Patent [19]

Prost

[11] Patent Number: 4,633,957

[45] Date of Patent: Jan. 6, 1987

[54] SOIL PLUGGER WITH PLUG EJECTOR

[76] Inventor: Claude D. Prost, 4009 Port Cleburne La., Hermitage, Tenn. 37076

[21] Appl. No.: 723,057

[22] Filed: Apr. 15, 1985

[51] Int. Cl.$^4$ .................... A01B 45/04; A01B 45/02; F16K 31/00; A01C 11/00
[52] U.S. Cl. ........................................ 172/22; 111/4; 251/297
[58] Field of Search ................. 172/22; 111/2, 4, 7.1, 111/7.2, 7.3, 7.4; 251/297

[56] References Cited

U.S. PATENT DOCUMENTS

| | | | |
|---|---|---|---|
| 684,010 | 10/1901 | Thalheimer | 294/50.5 |
| 792,189 | 6/1905 | Banks | 111/7.1 |
| 1,783,026 | 11/1930 | Ober | 294/50.5 |
| 1,814,445 | 7/1931 | Irish | 111/7.1 |
| 1,814,446 | 7/1931 | Irish | 111/7.1 |
| 1,979,541 | 11/1934 | Gunn | 111/7.1 |
| 2,027,005 | 1/1936 | Tatroe | 111/7.1 |
| 2,157,915 | 5/1939 | Olson | 111/7.1 |
| 2,181,189 | 11/1939 | Lathan | 111/7.1 |
| 2,306,165 | 12/1942 | Irish | 111/7.1 |
| 2,635,001 | 4/1953 | Slinkman | 294/50.5 |
| 2,875,713 | 3/1959 | Shoffer | 111/7.1 |
| 3,123,391 | 3/1964 | Novak | 172/22 X |
| 3,149,878 | 9/1964 | Mockabee | 294/50.5 |
| 3,210,112 | 10/1965 | Glynn | 294/50.7 |
| 3,506,296 | 4/1970 | Nelson | 294/50.7 |
| 3,584,994 | 10/1970 | Sterk | 423/212 |
| 3,602,245 | 8/1971 | Meisel | 251/297 X |
| 3,891,182 | 6/1975 | Schwerin | 251/297 |
| 4,278,035 | 7/1981 | Pickett et al. | 111/2 |
| 4,466,490 | 8/1984 | Eckels | 111/7.1 X |

FOREIGN PATENT DOCUMENTS 798638 11/1968 Canada ................... 111/7.1

Primary Examiner—Richard J. Johnson
Assistant Examiner—Terrence L. B. Brown
Attorney, Agent, or Firm—Luedeka & Neely

[57] ABSTRACT

The specification discloses a soil plugging and ejecting apparatus for being inserted into soil to form and remove a soil plug and for ejecting the plug. The apparatus includes an elongate tubular body having a cutting edge on its lower end for piercing the soil to form a plug. A step attached to the body receives downward pressure to force the apparatus into the soil and a grip attached to the upper end of the body provides a means for holding and guiding the apparatus, and for pulling it out of the soil after the plug is formed. A valve mounted on the apparatus is in fluid-flow communication with a source of pressurized fluid and the body, and is operable to selectively admit pressurized fluid into the body to eject a plug from the lower end of the body. The valve can be actuated by a handle or a button.

13 Claims, 6 Drawing Figures

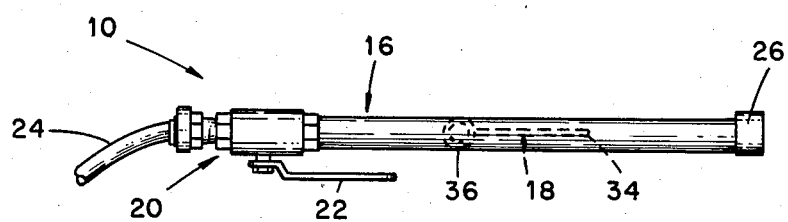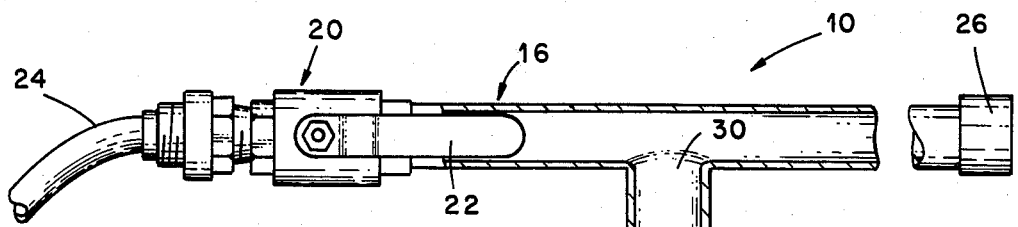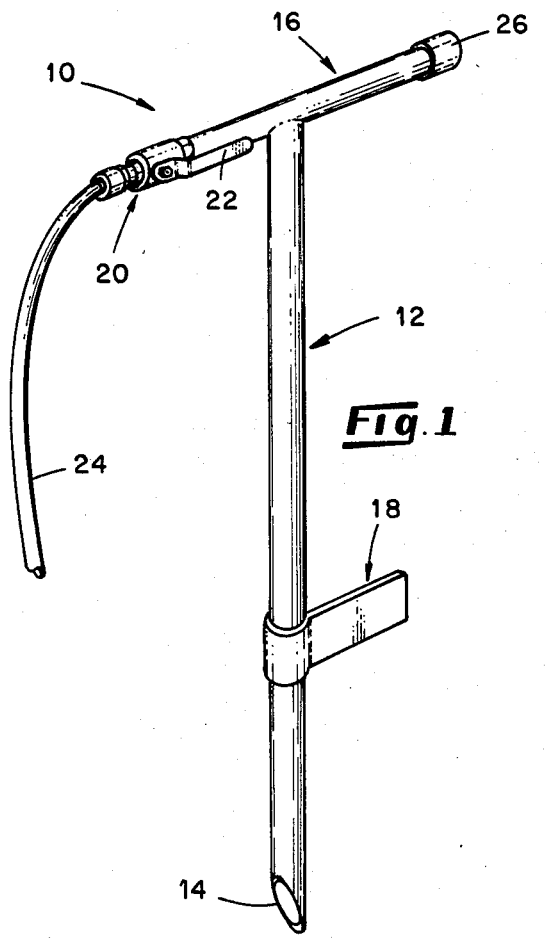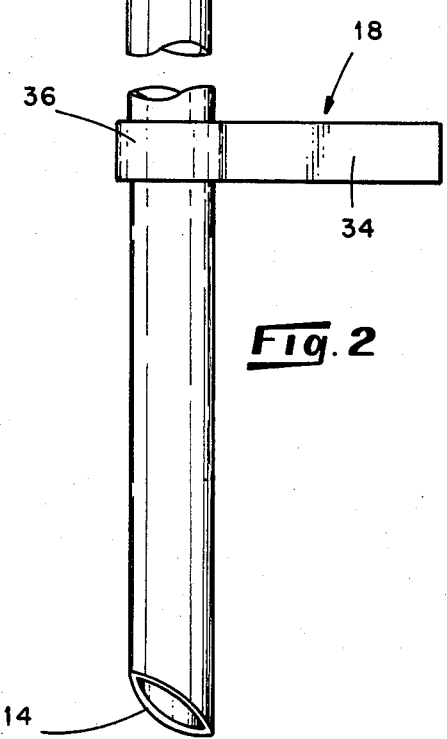

SOIL PLUGGER WITH PLUG EJECTOR

The present invention relates to lawn and garden tools and more specifically relates to a soil plugging and ejecting apparatus for being inserted into soil to form and remove a soil plug and for ejecting the plug using the force of pressurized fluid.

Tools capable of forming and removing plugs of soil have long been used in lawn and garden applications to aid in planting, weeding and the like. For example, U.S. Pat. No. 2,635,001 to Slinkman discloses a Plant Root Puller having a tubular body with an oblique lower extremity and an entering point for entering the soil, and a plunger for ejecting the root and dirt after the device has been removed from the soil. Similarly, U.S. Pat. No. 3,506,296 to Nelson shows an Optional Digger for Garden and Lawn with a tube having cutting teeth on its lower end and a plunger for pushing the plug of earth out of the lower end of the tube.

Thus, it is seen that using a cylindrical tube for making a soil plug and a plunger for removing the plug from the lower end of the tube is known in the art.

In some commercial applications of such devices, it is desirable to produce and rapidly collect the plugs. For example, grass plugs are produced commercially and sold in bulk or in packages. Heretofore, it has been the practice to either carry the device to a container and then utilize the plunger to remove the plug, or to use the plunger to deposit the plug near the hole and come back later to pick them all up. An apparatus which eliminates these extra tasks would be a welcome addition to the art, making it easier and faster for operators to complete the job of plugging an area of soil.

A need has thus arisen for soil plugging and ejecting apparatus for being inserted into soil to form and remove a soil plug, and for ejecting the plug to a central location or container.

The present invention solves the foregoing and other problems long associated with soil plugging devices by providing a soil plugger and ejector apparatus which utilizes a source of pressurized fluid for ejecting a soil plug from the apparatus to a remote central location. That is, the soil plugs are actually shot by the operator to a central collection point or container. Also, removal of the plug in this manner is almost effortless since the pressurized fluid supplies the force needed to eject the plug.

In accordance with the present invention, a soil plugging and ejecting apparatus for being inserted into soil to form and remove a soil plug and for ejecting the plug is provided including an elongate tubular body having an upper and a lower end, and having a cutting edge disposed at its lower end. A step is disposed on the body for receiving downward pressure to force the apparatus into the soil so that the lower end of the body receives therein a plug of soil. A grip disposed on the body is used to hold and guide the body when the apparatus is forced into the soil. A valve mounted on the apparatus is in fluid flow communication with the body and with a source of pressurized fluid, and is operable to selectively admit pressurized fluid into the body, whereby admitting pressurized fluid into the body causes a plug to be ejected from the lower end of the body. Provision is made for actuating the valve to selectively admit pressurized fluid into the body to eject a plug.

Thus, the present invention contemplates using pressurized fluid to force a plug out of the body ejecting the same into a nearby container or collection area. Water is the preferable fluid for use with the apparatus and is conveniently made available to the apparatus using a standard garden hose. There do exist devices in the prior art which are used for delivering irrigating and fertilizing agents beneath the soil. One such device is disclosed in U.S. Pat. No. 2,027,005 to Tatroe where there is shown a Root Spray having a pipe with a valve attached. The device is used for watering the roots of plants and uses a small size pipe. It is stated in Tatroe that the valve should be open allowing water to flow through the pipe as it is pressed into the ground to "prevent dirt from clogging up the bore of the pipe". A similar device is disclosed in U.S. Pat. No. 1,814,445 to Irish. Irish shows a self Tamping Aeration Tool for loosening soil beneath the surface and for supplying air to the roots of trees and plants. It is recommended in the Irish patent that a hole be made prior to insertion of the tool since the ground would probably be too hard to pierce with the tool itself. Thus, both Tatroe and Irish, and devices of that type, contemplate the use of a pipe and a valve for passing water or air beneath the surface of the soil. There is no suggestion in either Tatroe or Irish of using such a device for making a soil plug and for ejecting the plug using pressurized fluid. In fact, statements in the disclosures of Tatroe and Irish expressly eliminate any suggestion of such a use. Therefore, the present invention meets a completely different need in a completely different way by providing structure which allows a plug to be formed in the body and which utilizes pressurized fluid to eject the plug to a remote location after it is extracted from the soil.

In accordance with another aspect of the present invention, the valve is actuated by a button that is movable between a first and a second position. The button is in its first position when the valve is closed and is operable when moved to its second position to open the valve admitting pressurized fluid into the body to eject a plug. A spring is biased to oppose movement of the button from its first to its second position and is operable to urge and translate the button from its second to its first position to close the valve. Structure is provided for releasably holding the button in its second position, and the button is preferably positioned proximate the grip so that the button may be operated by the thumb of a hand holding the grip.

The advantages and further aspects of the present invention will be readily appreciated by those of ordinary skill in the art as the same becomes better understood by reference to the following detailed description when considered in conjunction with the accompanying drawings in which:

FIG. 1 is a perspective view of the soil plugging and ejecting apparatus illustrating one embodiment of the present invention where there is shown an elongate tubular body, a grip attached to the top of the body, and a valve for admitting pressurized fluid into the body;

FIG. 2 is a front elevational view partially in section illustrating the attachment of the grip to the body;

FIG. 3 is a top plan view of the apparatus;

Figure 4:
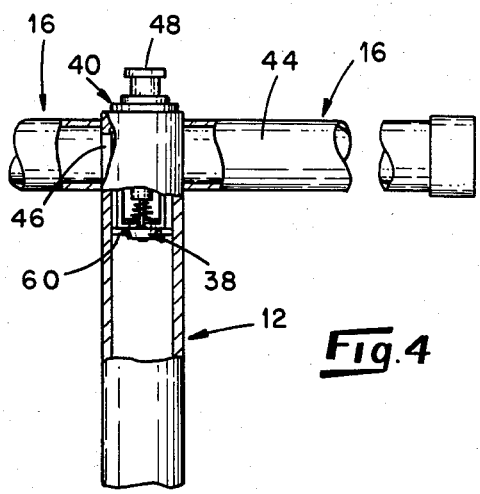
FIG. 4 is a front elevational view of an alternate embodiment of the present invention illustrating the use of a button-actuated valve for admitting pressurized fluid into the body.

Referring now to the drawings in which like reference characters refer to like or similar parts throughout the several views, there is shown in FIG. 1 a soil plugging and ejecting apparatus 10 representing a preferred embodiment of the present invention. The apparatus 10 is operable to be forced into soil to form and remove a soil plug and to utilize the force of a pressurized fluid to eject the plug which has been removed from the soil. The apparatus 10 comprises an elongate tubular body 12 having a cutting edge 14 at its lower end. A preferred means for stabilizing and holding the apparatus 10 is provided by a tubular grip 16 disposed at the top of the body 12. The grip 16 allows the apparatus 10 to be held and guided by an operator when the apparatus 10 is forced into the soil, and is used to pull the apparatus 10 out of the soil after a plug is formed. A suitable means for receiving downward pressure to force the apparatus 10 into the soil is provided by a step 18 extending laterally from the body 12. The step 18 is disposed a convenient distance from the grip 16 to allow the operator to place his foot on the step 18 while standing with his hands controlling the grip 16. A preferred means for admitting pressurized fluid into the apparatus 10 is provided by a valve 20 actuated using a handle 22 attached to the moving mechanism of the valve 20. A conduit 24 is received by the valve 20 for passing pressurized fluid, preferably water, into the valve 20 which is also in fluid flow communication with the body 12.

In operation, the valve 20 and handle 22 cooperate to allow an operator to selectively admit pressurized fluid into the apparatus 10. The operator places the apparatus 10 in position with the cutting edge 14 in contact with the top of the soil, using the grip 16 to hold the apparatus 10 in an upright position. At this point, the valve 20 is closed to prevent flow of pressurized fluid into the body 12. The operator places his foot on the step 18 and forces the apparatus 10 into the soil so that the lower end of the body 12 receives therein a plug of soil. It may be found advantageous to force the apparatus 10 into the soil at an angle slightly less than ninety degrees with the plane of the surface of the soil. This will lessen significantly the likelihood that the plug will fall or slide out of the body 12 when the apparatus 10 is removed from the soil. The soil plug will extend up into the hollow center of the body 12 to a height generally equal to the depth of the hole remaining after the plug is removed from the soil. Using grip 16, the operator then pulls the apparatus 10 out of the soil with the plug remaining in the lower end of the body 12.

After the apparatus 10 is lifted from the soil, the operator manipulates the handle 22 to move the valve 20 to its open position allowing pressurized fluid to enter the grip 16 which is in fluid flow communication with the body 12 where the grip 16 and body 12 are joined together. It should be noted that the grip 16 is sealed by means of a cap 26 on its end opposite the valve 20 so that fluid is forced to enter the body 12. The pressure of the fluid entering the body 12 imparts a force against the plug causing it to be ejected from the lower open end of the body 12. If the fluid used is water, it will make subsequent insertions of the apparatus 10 into the ground much easier. This is due to the lubricating effect of the water remaining on the lower part of the body 12. The presence of water inside the body 12 also makes ejecting a plug easier.

One principle advantage of the present invention involves the ability of an operator to direct the ejected plugs into a single area or into a receptacle. This is made possible by the fact that the force caused by the pressurized fluid greatly exceeds the resistance of the plug within the body 12 in combination with the weight of the plug so that the plug is propelled out of the apparatus 10 to a distance of ten feet or more. Devices in the prior art required that the plugs either be carried to a remote location, one at a time, or be deposited randomly upon the ground to be picked up later. Thus, the present invention makes plugging soil easier, more efficient and faster by freeing the operator of the task of picking up the plugs or carrying them individually after they are removed from the soil.

Referring now to FIG. 2, the apparatus 10 is shown with sections removed to illustrate the preferred method of constructing the apparatus 10 and of attaching the grip 16 to the body 12 so that the grip 16 and body 12 are in fluid flow communication. A length of tubing is selected for the grip 16 to provide space on each side of the body 12 so that the apparatus 10 can be held with a hand on each side. An opening 30 provides fluid flow communication between the grip 16 and the body 12 and is formed in the tube slightly to the left of center, as can be seen in FIG. 1. The body 12 is suitably constructed from the same type tubing used for the grip 16 and has a length approximately equal to the waist height of an average sized person. The diameter of tubing selected will be in the order of one to two inches and should have a sufficient wall thickness to support the expected forces without deforming. One end of the tubing selected for the body 12 is cut at about a forty five degree angle as shown in FIG. 2 to form the cutting edge 14. The other end is sealably attached to the grip 16 to cover the opening 30, preferably by welding, so that the body 12 and grip 16 form a T-shaped piece. The end of the grip 16 opposite the cap 26 is threaded to receive the standard-type valve 20. As can be seen in FIG. 3, the handle 22 used to actuate the valve 20 is displaced somewhat from the valve 20 by means of an angular bend adjacent the attachment of the handle 22 to the valve 16. This allows the operator to more easily grip and move the handle 22. A fitting is screwed into the opposite end of the valve 20 to receive the male end (outlet) of a standard water hose. The step 18 is formed by welding a suitably dimensioned rectangular plate 34 to a sleeve 36 having a diameter of about, but greater than, that of the body 12. The sleeve 36 is then placed on the body 12 at a convenient location for receiving downward pressure from the foot of an operator and is welded in place. Thus, it is seen that the apparatus 10 can be manufactured with a minimum number of components, all of which are suitably provided by standard, readily available materials. The construction is fast, easy, and inexpensive, producing a device offering substantial advantages over plugging devices in the prior art.

Although not shown, it is to be appreciated that the valve 20 can be placed at either end of the grip 16, or on the body 12. If placed on the body 12, it may not be required that the grip 16 and body 12 be in fluid-flow communication which would eliminate the necessity of having the opening 30 in the grip 16 or of using the cap 26. This would be the case, for example, if provision were made on the body 12 for receiving the hose connection above the valve 20.

Figure 5:
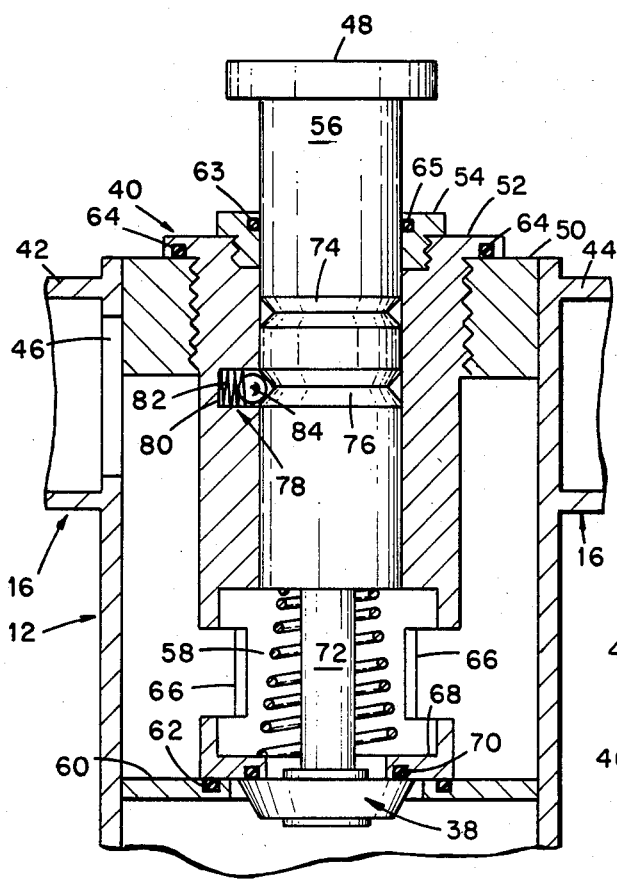
FIG. 5 is a cross-section view of the button-operated valve of FIG. 4 in its closed position.
Figure 6:
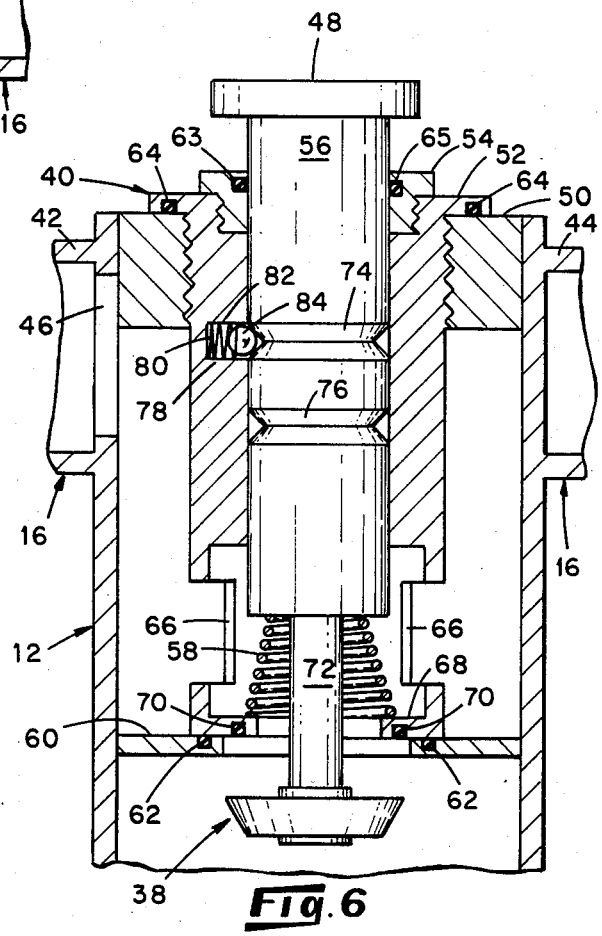
FIG. 6 is a cross-section view of the button-operated valve in its open position.

Referring now to FIGS. 4, 5 and 6 there is shown an alternate means for admitting pressurized fluid into the plugging and ejecting apparatus 10. As can be seen in FIG. 4, a button-operated valve 38 is located at the junction of the grip 16 and the body 12. In this embodiment, as illustrated in FIGS. 5 and 6, the tubular body 12 extends through the grip 16 so that the upper end of the body 12 receives therein a button-valve assembly 40. This results in the grip 16 being formed from first and second tubular sections 42 and 44, each being welded on their inner end to the uppermost end of the body 12. An opening 46 is formed on the upper end of the body 12 adjacent the first tubular section 42 to permit passage of pressurized fluid from the first section 42 into the area within the body 12 adjacent the assembly 40. The wall of the body 12 adjacent the second section 42 of the grip 16 is closed so that no fluid flows into the second section 42.

The button-valve assembly 40 is illustrated in cross-section in FIGS. 5 and 6, the former being representative of the closed position of the valve 38 and the latter representing the open position of the valve 38.

The advantage of using a button 48 is that the operator of the apparatus 10 can use his thumb which will be innermost on the grip 16 to actuate the valve without moving his hand. For some operators, this placement will be more satisfactory than the handle 22 illustrated in FIGS. 1, 2 and 3. It also offers more instantaneous control over the ejecting of plugs from the apparatus 10.

Referring to FIGS. 4 and 6, the button-valve assembly 40 comprises a button cylinder 52 disposed within a mounting sleeve 50, a sealing nut 54 disposed within the cylinders 52 at its top, a button stem 56 extending through the cylinder 52, a spring 58 disposed between the stem 56 and the lower part of the cylinder 52, and the valve 38.

The mounting sleeve 50 supports the button-valve assembly 40 within the body 12 at the top of the cylinder 52. The mounting sleeve 50 has an outer diameter of about, but slightly less than, that of the inner diameter of the body 12 and is dimensioned along its axial length to be essentially flush with the top of the body 12 while extending into the body 12 to cover about one third of the opening 46 in the first section of the grip 16. The sleeve 50 is preferably secured within the body 12 by welding the seam between the sleeve 50 and the body 12 on the outside. A support ring 60 is welded in the body at a predetermined location. The ring 60 includes a support seal 62 against which the lower end of the cylinder 52 is tightened to prevent flow into the body 12 when the valve 38 is closed.

An O-ring seal 63 is pressed into an annular groove 65 disposed on the inner face of the sealing nut 54. The seal 63 prevents fluid from passing up the cylinder 52 out of the apparatus 10 where the button stem 56 enters the nut 54. The sleeve 50 is threaded to receive the cylinder 52 which is dimensioned to be tightened against the sleeve 50 as the lower end of the cylinder 52 is tightened against the support seal 62. An outer ring seal 64 is seated in a flanged portion of the cylinder 52 to prevent leakage of fluid between the sleeve 50 and the cylinder 52. A plurality of flow-through apertures 66 located in the lower part of the cylinder 52 provide fluid-flow communication between the area within the body 12 adjacent the assembly 40 and the valve 38.

The lower part of the cylinder 52 is open to house the spring 58 which is supported on an inwardly facing annular flange 68 extending toward the center of the cylinder 52 from the lowermost portion of the cylinder 52. An O-ring 70 is disposed within the lower face of the flange 68 to provide a seal between the cylinder 52 and the valve 38 when the valve 38 is closed. The inner diameter of the opening in the flange 68 is dimensioned to allow sufficient flow of fluid through the apertures 66 into the body 12 when the valve 38 is open.

The spring 58 is formed in the shape of a truncated cone with the upper spirals having a diameter slightly less than that of the button stem 56 and the lower spirals having a diameter slightly greater than that of the opening in the flange 68. The spring 58 should be secured to the button stem 56 and the flange 68 to prevent displacement of the spring 58 during operation of the apparatus 10.

The valve 38 is attached to the bottom stem 56 by an extension rod 72 having an axial length so that the upper surface of the valve 38 is in contact with the O-ring 70 when the valve 38 is in its closed position as shown in FIG. 5. The valve 38 is shaped in the form of a truncated cone inverted with the base facing upwardly. The diameter of the base is slightly less than the inner diameter of the support ring 60 so that the valve 38 seats against the O-ring 70 in the flange 68, within the ring 60.

Upper and lower annular grooves 74 and 76 are disposed on the stem 56 in a spaced relationship. A ball and spring assembly 78 is disposed in a recess 80 formed in the inner wall of the cylinder 52. The assembly 78 comprises a spring 82 which holds a ball 84 in contact with the button stem 56. The spring 82 forces the ball 84 into the lower groove 76 when the button 48 is up and the valve 38 is closed as shown in FIG. 5. This holds the valve 38 in its closed position until sufficient pressure is applied to the button 48 to overcome the resistance to movement caused by the presence of the ball 84 in the groove 76 combined with the force of the spring 58 against the lower end of the stem 56. When sufficient pressure is applied to begin downward movement of the button 48, the ball 84 is forced back into the recess 80, the spring 58 is compressed, and the valve 38 moves away from the flange 68 allowing flow of pressurized fluid through the apertures 66 and the opening in the flange 68 into the body 12. When the button 48 has been moved to the position shown in FIG. 6 with the upper groove 76 adjacent the ball and spring assembly 78, the spring 82 forces the ball 84 into the groove 74 so that the valve 38 is held open. This allows the operator to release the button 48 since the resistance to movement caused by the presence of the ball 84 in the groove 74 exceeds the force of the spring 58 against the lower end of the button stem 56. The valve 38 can be returned to its closed position by depressing the button 48 further so that the upper groove 74 moves below the recess 80, and then quickly releasing the button 48 allowing the force of the spring 58 to move the button stem 58 upwardly whereby the combination of the force of the spring 58 and the momentum of movement of the stem 56 causes the upper groove 74 to move past the ball and spring assembly 78 to the closed position shown in FIG. 5. The valve 38 may also be returned by pulling the button 48 up.

The button valve assembly 40 is easily assembled prior to insertion into the apparatus 10. This allows the assembly 40 to be manufactured separately and sold as a replacement part making it possible for an operator to use the apparatus 10 indefinitely by replacing assemblies as they wear out. And it should be noted that the upper flanged portions of the cylinder 56 and nut 54 have a standard hexagonal nut head shape so they can be inserted and removed with an ordinary wrench.

Although particular embodiments of the present invention have been described in the foregoing detailed description it will be understood that the invention is capable of numerous rearrangements, modifications and substitutions of parts without departing from the scope of the invention according to what is claimed below.

What is claimed is:

1. A soil plugging and ejecting apparatus for being inserted into soil to form and remove a soil plug and for ejecting the plug, comprising:
    an elongate tubular body having an upper and a lower end;
    a circular cutting edge formed on said lower end of said tubular body, said edge operable to pierce and enter the soil to and remove a cylindrical soil plug in the lower end of said body when the apparatus is inserted into the soil;
    a grip extending across and attached to said upper end of said tubular body forming a T-shaped configuration therewith for being held by an operator to guide and stabilize the apparatus as it is inserted into and removed from the soil;
    elongated step means disposed on said body extending generally parallel to the grip for receiving downward pressure from the foot of the operator to force the apparatus into the soil;
    a valve mounted on the apparatus proximate to the grip in fluid flow communication with said body and with means for connection with a source of pressurized water, said valve operable to be moved between a first and second position, and operable in its first position to be closed so that flow of pressurized water into said body is prevented and operable in its second position to be open allowing flow of pressurized water into said body to eject a plug; and
    actuating means operable to actuate said valve to selectively admit pressurized water into said body to eject a plug formed in the lower end of said body after the apparatus has been removed from the soil.

2. The soil plugging and ejecting apparatus of claim 1, wherein said actuating means comprises a handle attached to said valve operable to be moved between a first and a second position, said handle being in said first position when said valve is closed preventing pressurized water from flowing into said body and in said second position when said valve is open allowing pressurized water to flow into said body to eject a plug.

3. The soil plugging and ejecting apparatus of claim 1, wherein said grip has a tubular shape and is disposed perpendicularly to said body, said grip having a first and a second end, said second end of said grip being sealed to prevent fluid flow therethrough and said first end being in fluid flow communication with said valve.

4. The soil plugging and ejecting apparatus of claim 3, wherein said valve is disposed on said first end of said grip.

5. The soil plugging and ejecting apparatus of claim 3, wherein said
    actuating means is located proximate to the center of said grip so that said actuating means may be operated by the thumb of a hand holding the grip.

6. The soil plugging and ejecting apparatus of claim 1, wherein said actuating means comprises;
    a button mounted in said tubular body proximate to the grip and being operable to be moved from a first to a second position to move said valve from its first to its second position;
    a button stem attaching said button to said valve; and
    a spring biased to oppose movement of said button from said first to said second position and operable to urge and translate said button from said second to said first position when said button is released so that said valve moves to its first position.

7. The soil plugging and ejecting apparatus of claim 6, further comprising means for releasably holding said button in said second position allowing said button to be released whereby pressurized water continues to flow into said tubular body to eject a plug.

8. The soil plugging and ejecting apparatus of claim 7, wherein said means for releasably holding comprises:
    an annular groove disposed on said button stem; and
    a ball and spring assembly disposed adjacent said groove, said spring operable to to urge said ball against said button stem as said button stem moves by said assembly and to urge and translate said ball into said groove when said groove moves adjacent said ball, whereby said button is held in said second position.

9. The soil plugging and ejecting apparatus of claim 1, wherein said actuating means comprises:
    a button operable to be moved by an operator from a first to a second position to move said valve from its first to its second position; and
    means for biasing said valve to oppose movement of said valve from its first to its second position and for urging and translating said valve from its second to its first position when the operator releases the button.

10. The soil plugging and ejecting apparatus of claim 9, wherein said biasing means comprises
    a spring biased to opposed movement of said button from said first to said second position and operable to urge and translate said button from said second to said first position to close said valve.

11. The soil plugging and ejecting apparatus of claim 10, further comprising:
    said button being attached to said valve; and
    stop means for sealably engaging and stopping movement of said valve when said button is in said first position, said spring configured to hold said valve in contact with said stop means and to oppose movement of said valve away from said stop means.

12. The soil plugging and ejecting apparatus of claim 11, wherein said grip comprises a tubular member fixedly mounted on said body at said upper end of said body approximately perpendicular to said body, said tubular member operable to be gripped by an operator of said apparatus.

13. The soil plugging and ejecting apparatus of claim 12, further comprising means for releasably holding said button in said second position so that an external force holding said button in said second position may be released.

* * * * *